United States Patent

[11] 3,552,445

| [72] | Inventor | Thomas I. Andrews<br>Los Altos Hills, Calif. |
|---|---|---|
| [21] | Appl. No. | 817,492 |
| [22] | Filed | Apr. 18, 1969<br>Continuation-in-part of application Ser. No.<br>496,080, Oct. 14, 1965, now abandoned. |
| [45] | Patented | Jan. 5, 1971 |
| [73] | Assignee | Seefore Corporation<br>San Jose, Calif.,<br>a corporation of California |

[54] INSULATED PIPE ASSEMBLY
4 Claims, 4 Drawing Figs.

[52] U.S. Cl. .................................................. 138/144,
138/149
[51] Int. Cl. .................................................. F16l 59/00
[50] Field of Search .......................................... 161/250;
138/141, 149, 144

[56] References Cited
UNITED STATES PATENTS

| 2,756,172 | 7/1956 | Kidd............................ | 138/149X |
| 3,131,113 | 4/1964 | Arbit et al..................... | 161/250X |
| 3,269,422 | 8/1966 | Matthews et al............... | 138/140X |

*Primary Examiner*—Laverne D. Geiger
*Assistant Examiner*—Richard J. Sher
*Attorney*—Flehr, Hohbach, Test, Albritton & Herbert ABSTRACT: An insulated pipe assembly including a porous insulation surrounding a pipe, a protective reinforced plastic case surrounding and encasing the insulation, and a barrier therebetween. Said barrier comprises an absorbent layer, such as paper, partially infused with and bonded to a polyethylene layer which is wrapped about and in contact with the insulation. The plastic case is formed in situ about the barrier, penetrating said absorbent layer and mechanically interlocking therewith for forming a unitary plastic case about the insulation.

PATENTED JAN 5 1971   3,552,445
FIG_1
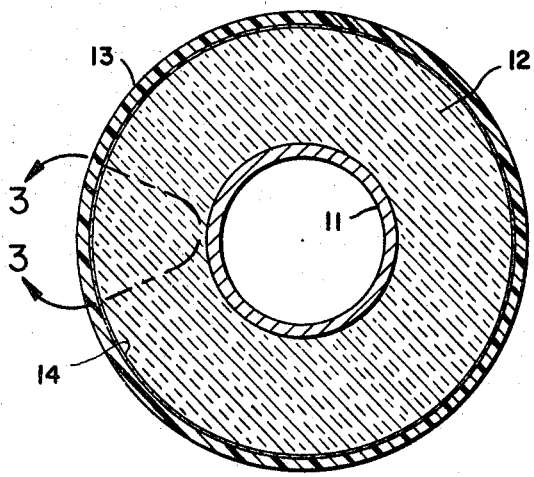
FIG_2
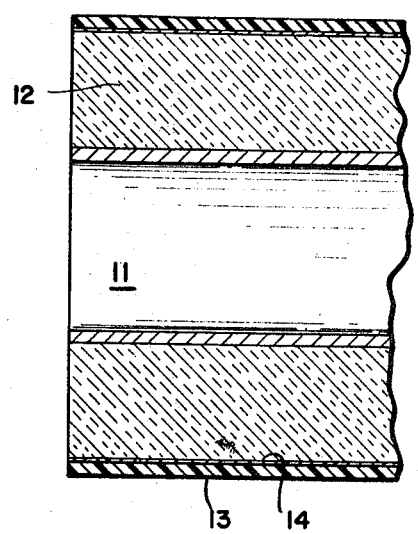
FIG_3
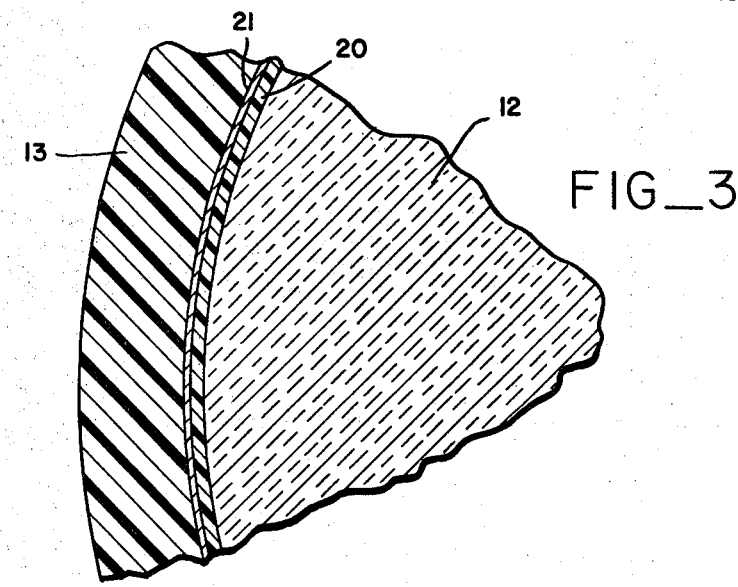
FIG_4
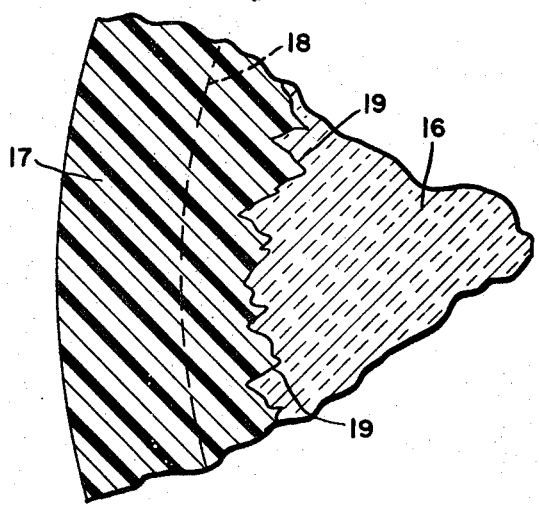
INVENTOR.
THOMAS I. ANDREWS
BY
ATTORNEYS

INSULATED PIPE ASSEMBLY

CROSS REFERENCE TO RELATED APPLICATIONS

This application is a continuation-in-part of Ser. No. 496,080, filed Oct. 14, 1965 now abandoned.

BACKGROUND OF THE INVENTION

This invention relates generally to an insulated pipe assembly and more particularly to a pipe assembly including porous insulating material surrounding a pipe and a protective reinforced plastic case surrounding or encasing the same.

Insulated pipes of the prior art have included a jacket of insulating material, such as fiberglass, surrounding the pipe, and a protective casing applied to the insulating material to form a moisture barrier and to protect the insulation against abrasion and physical damage. Such plastic casings have in the past been formed by spraying or otherwise applying, such as brushing, a layer of reinforced plastic directly on the surface of the insulating material—. For example, the casing may comprise a fiberglass reinforced plastic.

Extreme care must be exercised in forming a casing of this type so that the plastic, when liquid, does not penetrate deeply into the insulating material forming the jacket since this lowers the insulating properties of the material. Even when extreme care is exercised, there is penetration and consequent deterioration of the insulating properties of the material.

SUMMARY OF THE INVENTION AND OBJECTS

An insulated pipe construction having insulating material disposed around the pipe with a barrier layer including an inner layer of plastic material impervious to a different plastic and an outer layer of absorbent material bonded to the plastic layer and an outer case of protective reinforced plastic applied as a liquid about said barrier to penetrate the layer of absorbent material and from an intimate mechanical connection therewith.

It is an object of the present invention to provide a plastic-encased insulated pipe assembly which includes a liquid barrier film isolating the insulating material from the plastic case.

It is another object of the present invention to provide an insulated pipe assembly of the foregoing character which includes a bonded composite malleable barrier film isolating and sealing the insulating material from the plastic case while adhering to the plastic.

The foregoing and other objects of the invention will be more clearly understood from the following description taken in conjunction with the accompanying drawings.

BRIEF DESCRIPTION OF THE DRAWINGS

FIG. 1 is an end view, in section, of an insulated pipe assembly in accordance with the invention.

FIG. 2 is a sectional view taken along lines 2-2 of FIG. 1.

FIG. 3 is an enlarged view of the portion 3-3 of FIG. 1.

FIG. 4 is an enlarged view in section of a portion of a prior art insulated pipe assembly.

DESCRIPTION OF THE PREFERRED EMBODIMENTS

Referring first to FIGS. 1 and 2, there is shown an insulated pipe assembly including a carrier pipe 11 which is jacketed with a layer of insulating material 12, such as blanket fiberglass. A plastic case 13 is provided to protect the insulation against the environment and from physical damage. The plastic case includes a liquid impervious barrier 14 which is interposed between itself and the insulating material 12 and which becomes an integral part of the case 13. The barrier 14 prevents penetration of uncured liquid polymer components of which the plastic case 13 is formed, into the insulating material 12. The barrier also provides a mat into which the polymer penetrates and sets to form the composite plastic.

Before describing the assembly in greater detail, reference is made to FIG. 4 wherein an enlarged partial view of an outer section of a prior art insulating pipe assembly is shown. The insulating material is shown at 16, while the plastic case is shown at 17. The dotted line 18 indicates the outer surface of the insulating material 16, and the line 19, the penetration of the plastic into the same. The insulating value of the material between the lines 18 and 19 is appreciably reduced by the filling of the interstices by the plastic material having lower heat insulating properties.

As described above, the present invention provides a barrier layer 14 which encloses the outer surface of the insulating material 12 as by helical wrapping of an elongate sheet of the same about the insulation. The barrier layer 14 includes two layers, a flexible plastic layer 20 and an absorbent paper layer 21 joined to one another to form a composite. The absorbent layer comprises a paper, such as high quality paper toweling. The paper toweling is characterized by being made of many intertwined and intermingled strands randomly oriented and interspersed together to form a felted porous mat possessing many small randomly oriented and interconnected interstices. A lightly calendered, high bulk elongate rolled toweling of low caliber has been found satisfactory and is formed to have adequate strength against split tearing, that is to say, tearing in the plane of the sheet. Preferably, the toweling is formed with a slight amount of crepe to permit some stretch so as to facilitate smooth helical wrapping of the sheet under tension from a roll without tears, bumps or waves.

The plastic layer 20 is provided on one side only of the paper layer 21 and is applied thereto by suitable procedure as by spraying or coating with an unset liquid form thereof. The plastic layer is composed of some suitable plastic which is impervious and nonreactant to moisture and to the uncured material of which the case is made. In this way, the liquid plastic of which the case is made cannot penetrate to the insulation. One suitable plastic is polyethylene. Before setting, the applied plastic infuses or interpenetrates a partial thickness of the paper and flows into the interstices to form an interconnected flexible mass throughout the entire available volume within that partial thickness of the toweling. This leaves the remaining thickness of the toweling available as a rough surface for the plastic of the case to adhere to.

The barrier layer is then wrapped about the pipe and insulation with the plastic side facing the latter and the paper side facing outwardly. The casing is then applied in situ as an incompletely cured polymeric formulation which, for example, is selected so as not to be deleterious to either the paper layer 21 or the plastic layer 20. An example of such is an epoxy. The polymeric formulation of the casing penetrates the remaining volume of the interconnected interstices of the paper layer to the interface of the barrier layer where it is blocked. The casing is cured into a strong, stiff, solid mass by incorporation of a suitable curing agent. The resulting structure is characterized by complete mechanical interlocking of the plastic of the casing and barrier into each partial thickness of the paper. Each plastic forms interconnected branches throughout the volume of the interstices. Even through that casing and barrier would not otherwise adhere, they are now integrally and uniformly joined together in an extremely strong, reliable structure in which the casing contributes mechanical strength, and the plastic barrier further provides an effective seal to prevent leakage into the insulation through holes or cracks which might develop in the outer casing. This results in a plastic-encased insulated pipe assembly having improved insulating properties.

As is well known, the outer plastic 13, may be a polyester or epoxy and may include fiberglass reinforcing material. The insulating material 12 described as fiberglass may be calcium silicate, asbestos, expanded polystyrene, expanded polyurethane, magnesia or any other suitable insulating material.

Thus it is seen that there has been provided a plastic-encased insulated pipe assembly having improved characteristics.

I claim:

1. In an insulated pipe construction, a pipe, a layer of insulating material formed about said pipe, a barrier layer laid about the outside of said insulating layer, said barrier layer including an outer layer of felted, porous mat constructed of many intertwined and intermingled strands randomly oriented and interspersed so that said mat possesses many small, randomly oriented, and interconnected interstices, an inner layer of plastic material characterized by being impervious to the penetration of an incompletely cured second material or water, said inner layer being applied to said outer layer as an incompletely set plastic liquid so that said outer layer as an incompletely set plastic liquid so that said inner layer interpenetrates a partial thickness of the outer layer and flows into the interstices within said outer thickness to form an interconnected pliable mass throughout the available volume therein, the remaining thickness of said outer layer remaining available as a porous volume, an outer casing protective plastic formed and applied as an incompletely cured liquid polymeric formulation about said barrier layer and cured in situ thereon, said polymeric formulation being of such a character that it interpenetrates the available remaining thickness of said outer layer and flows into the remaining interstices to form an interconnected solid mass therein to the interface of the inner layer, said inner layer and casing together forming an integral structure with said outer layer, said structure characterized by complete mechanical interlocking of the plastic of the casing and inner layer into each partial thickness in which each plastic forms interconnected branches throughout the respective volume of the interstices.

2. An insulated pipe construction as in claim 1 wherein said absorbent layer comprises a high bulk paper toweling.

3. An insulated pipe construction as in claim 1 wherein said paper toweling is an elongate, lightly creped sheet helically wrapped about said insulation under tension.

4. An insulated pipe construction as in claim 1 wherein said barrier plastic is a pliable plastic layer and said casing plastic is a strong, stiff plastic formulation which is incapable of penetration of said barrier when the formulation is in the incompletely cured state.